US009633581B2

(12) United States Patent
Heederik et al.

(10) Patent No.: US 9,633,581 B2
(45) Date of Patent: Apr. 25, 2017

(54) RECYCLING PROCESSES AND LABELS AND ADHESIVES AND USE THEREIN

(71) Applicant: Avery Dennison Corporation, Pasadena, CA (US)

(72) Inventors: Peter J. Heederik, Hillegom (NL); Jos Van Noort, Leiden (NL); Lenneke Van Der Bent, Leiden (NL); Graham Yeadon, Marbach (CH)

(73) Assignee: Avery Dennison Corporation, Glendale, CA (US)

( * ) Notice: Subject to any disclaimer, the term of this patent is extended or adjusted under 35 U.S.C. 154(b) by 102 days.

(21) Appl. No.: 14/137,702

(22) Filed: Dec. 20, 2013

(65) Prior Publication Data
US 2014/0175198 A1  Jun. 26, 2014

Related U.S. Application Data

(60) Provisional application No. 61/740,640, filed on Dec. 21, 2012.

(51) Int. Cl.
*B32B 38/10* (2006.01)
*G09F 3/10* (2006.01)
*B29B 17/02* (2006.01)
*C09J 133/12* (2006.01)
*C09J 135/02* (2006.01)
*C09J 5/00* (2006.01)
*B08B 9/08* (2006.01)
*C08F 220/18* (2006.01)
*C09J 133/08* (2006.01)
*B29L 31/00* (2006.01)

(52) U.S. Cl.
CPC .............. *G09F 3/10* (2013.01); *B08B 9/083* (2013.01); *B29B 17/02* (2013.01); *C08F 220/18* (2013.01); *C09J 5/00* (2013.01); *C09J 133/08* (2013.01); *C09J 133/12* (2013.01); *C09J 135/02* (2013.01); *B29L 2031/744* (2013.01); *C09J 2201/614* (2013.01); *C09J 2203/334* (2013.01); *C09J 2205/302* (2013.01); *Y02W 30/521* (2015.05); *Y02W 30/522* (2015.05); *Y02W 30/622* (2015.05); *Y10T 428/31504* (2015.04)

(58) Field of Classification Search
CPC ..... B08B 9/083; B08B 9/0835; B32B 43/006; Y10T 156/1111; Y10S 156/921; Y10S 156/936
See application file for complete search history.

(56) References Cited

U.S. PATENT DOCUMENTS 4,083,776 A * 4/1978 Shimoiizaka ............ B03B 5/42
209/155
4,131,584 A * 12/1978 Burke, Jr. .................. C08J 5/06
524/248
4,331,576 A   5/1982 Colon et al.
H509 H  *  8/1988 Chao ..................... C08F 220/18
526/264
4,795,103 A  * 1/1989 Lech ....................... B02C 13/04
241/101.76
5,183,841 A   2/1993 Bernard
5,512,612 A  * 4/1996 Brown .................... C09J 7/0217
523/218
5,759,653 A  * 6/1998 Collette .................. B32B 27/08
215/12.1
5,775,604 A  * 7/1998 Sato ..................... B02C 19/0087
241/154
6,290,153 B1 * 9/2001 Prox ....................... B02C 17/02
241/24.19
6,471,148 B1 * 10/2002 Mase, Jr. ................ B02C 17/06
241/178
6,680,097 B1 * 1/2004 Amberger ................. G09F 3/02
134/10
6,989,191 B2 * 1/2006 Weissgerber ........... B32B 27/30
427/208.2
7,214,723 B2 * 5/2007 West ....................... C08J 11/24
521/48
7,799,837 B2 * 9/2010 Yamane .................. B29B 17/02
521/40
2007/0012599 A1* 1/2007 Bohlig .................... B03B 9/062
209/12.1
2010/0051200 A1* 3/2010 Mueller ................. C09J 133/08
156/703
2012/0211032 A1* 8/2012 Trojosky ................... B03B 5/56
134/32

FOREIGN PATENT DOCUMENTS

DE    3001973      7/1981
DE    102009050819 4/2011
EP    0099087      1/1984
FR    2942215      8/2010
WO    00/36043     6/2000

OTHER PUBLICATIONS

Mike Sowden, How to Recycle Glass by Throwing it Away, Aug. 2008, http://ecosalon.com/how_to_recycle_glass_by_throwing_it_away/.*
International Preliminary Report on Patentability issued in corresponding International Application No. PCT/US2013/077262 dated Jul. 2, 2015.
Internationai Search Report and Written Opinion issued in corresponding International Application No. PCT/US2013/077262 dated Aug. 27, 2014.

* cited by examiner

*Primary Examiner* — Mark A Osele
(74) *Attorney, Agent, or Firm* — Avery Dennison Corporation

(57) ABSTRACT

A method for recycling materials having an affixed label is disclosed. The present invention also includes labels and adhesives that is readily removable from a material during a process for recycling the material.

34 Claims, No Drawings

RECYCLING PROCESSES AND LABELS AND ADHESIVES AND USE THEREIN

CROSS-REFERENCE TO RELATED APPLICATION

The present application claims the benefit of U.S. Provisional Application No. 61/740,640 filed Dec. 21, 2012, which is incorporated herein by reference in its entirety.

BACKGROUND OF THE INVENTION

Some products, such as consumer products, may be recycled. Some recyclable products, such as bottles and containers, may contain a label that is removed as part of a recycling process. The present invention relates generally to recycling processes and to labels and adhesives that may be used to facilitate such recycling processes.

SUMMARY OF THE INVENTION

In one embodiment, the invention includes a method for recycling a recyclable material having an affixed label. The method includes breaking the material having a label into pieces and exposing the pieces to outdoor conditions until at least a partial separation of some portion of label separates from the material. The method also includes separating the material from the label.

In another embodiment, the present invention includes a method for using a water sensitive adhesive. The method includes affixing a label to a recyclable material using a water sensitive adhesive. In an embodiment, the adhesive is configured to release the label from the recyclable material upon breaking the recyclable material into pieces and exposing the pieces to outdoor conditions for sufficient time to result in partial or complete separation of the label from the recyclable material.

The following description illustrates one or more embodiments of the invention and serves to explain the principles and exemplary embodiment of the invention.

DETAILED DESCRIPTION OF EXEMPLARY EMBODIMENTS

Reference will now be made in detail to exemplary embodiments of the present invention, one or more examples of which are illustrated in the accompanying drawings. Each example is provided by way of explanation of the invention and not by limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention includes a process for recycling a material having a label affixed thereto, wherein the label may be of the nature described below. In some embodiments, the process includes breaking or shattering the material the material into pieces and exposing the material to outdoor conditions. The material may be exposed for sufficient time in order for the label to initiate or to complete separation from the material. After exposure to outdoor conditions, the broken materials may be mixed or churned to further facilitate label removal. In addition, a separation process may be used, such as a float tank, to separate the materials from the label, such as for recycling purposes. Advantageously, in some embodiments of the present invention, increased temperatures or heating, caustic solution, or both are not required for label removal.

Outdoor conditions may vary by geographic region and seasonal time periods. However, except as otherwise specified, the present invention encompasses all such outdoor conditions. In addition, as contemplated herein, outdoor conditions may be provided by actual outdoor conditions or by similar conditions that are not actually outdoors. For example, in some embodiments, outdoor conditions may be provided by the actual placement of the broken materials in an outdoor setting. In other embodiments, however, outdoor conditions may be provided by providing or replicating outdoor conditions in an indoor environment.

In particular embodiments, outdoor conditions may include exposure to temperatures within the range of about −20° C. to about 40° C. In one embodiment, the present invention may include any outdoor conditions at temperatures above the freezing point for water. In addition, outdoor conditions may include atmospheric moisture levels that are sufficient to provide moisture to the broken materials and the labels thereon. In one embodiment, the present invention may include outdoor conditions having adequate moisture in the air to initiate separation of a label from broken material. In some embodiments, moisture or additional moisture may be provided to the broken materials, such as by spraying or soaking In some embodiments, suitable conditions for label removal may be solely sufficient moisture. In this regard, moisture or liquid having a weight that is about 2 percent to about 5 percent of the glass material may be suitable in some embodiments. In other embodiments, moisture of less than 5 percent of the glass material may be suitable. In still other embodiments, moisture of less than 2 percent or 1 percent of the glass material may be suitable. In some embodiments, such moisture may be supplied naturally, such as by rain water, by an artificial source, such as a jet or spray, or without any addition of liquid and present as residual liquid in a container or other article. The liquid may be any suitable liquid, such as water or liquid remaining in a container, such as a beverage in a beverage bottle. As noted above, the present invention includes embodiments in which the label is removed without the presence of any caustic solution.

In embodiments utilizing outdoor conditions, the exposure time to outdoor conditions may vary depending upon the materials, label, and adhesive. In some embodiments, exposure to outdoor conditions may be in the range of about 1 day to about 4 weeks, including each intermittent time period therein. In some embodiments, a period of about 3 days to about 7days may be used. In still other embodiments, a time period of at least about 3 days may be used. In some embodiments, exposure may be continued until label separation from the broken materials is observed visually. In some processes, the exposure time and the moisture level may be inversely proportional.

In other embodiments, exposure of broken glass material to moisture before tumbling the material for label removal may be for one day. In other embodiments, such exposure may be less than one day. In still other embodiments, such exposure may be in the range from about one minute to about one day, including each value and sub-range therein. In some embodiments, such exposure may be in the in the range of about one minute to about five minutes and, in other embodiments, such exposure may be less than five, four, three, two, or one minute(s).

By way of example, a recycling process of the present invention may be used for glass bottles having affixed labels. In an exemplary process, the bottles may be broken into pieces, wherein in the broken glass containers may be referenced as the "cullet." The cullet may then be exposed to outdoor conditions for adequate time to cause a separation of the label from the broken glass. In some embodiments, the cullet may be spun after exposure to outdoor conditions to further aid in the label separation. A separation process may then be used to separate the glass material from the label material such that the glass material can be recycled. In some embodiments, outside conditions may provide adequate moisture for initiating or completing label removal from the glass. Typically, glass cullet contains about 2% moisture, typically from residual liquid in the bottle. In some embodiments, such residual moisture may be sufficient to initiate label separation after the glass is broken. In still other embodiments, additional water may be provided to the glass cullet, such as by spraying.

Recycling processes of the present invention may be used for any suitable materials and labels. In one embodiment, glass containers may be subjected to the recycling processes of the present invention. In other embodiments, processes of the present invention may be used on other materials having affixed labels, such as materials like polypropylene, polyolefin, polyvinyl chloride ("PVC"), polyethylene terephtalate ("PET" and "PET LV"), polyethylene, plastics, or combinations thereof. In some embodiments, the materials form containers. As indicated, such labels may be applied to any article. By way of example, and without limitation, such articles may include any containers, such as bottles, jars, buckets, jugs, or any other article.

The present invention also includes labels that may be readily removed from materials, such as containers. One of ordinary skill in the art will appreciate that labels of the present invention may be manufactured from any conventional materials and any filmic materials suitable for labels. By way of example, and without limitation, labels of the present invention may be manufactured using a polymeric material such as a polyester, polyolefin, polyvinyl chloride, polystyrene, polypropylene, and copolymers and/or blends thereof. Other label materials may include materials selected from polylactic acid, cellophane, styrenics, polylactic acid, polycarbonate, polyamides, polystyrene, mixtures and copolymers of any of the foregoing. Labels of the present invention can be applied to containers comprising glass, polymers, metals, or any other suitable container material. An exemplary container may be polyester bottles. In particular embodiments, labels may be prepared using polyvinyl chloride ("PVC"), polyethylene terephtalate ("PET" and "PET LV"), polyolefin, polystyrene, oriented polystyrene ("OPS film"), polylactic acid ("PLA film"), polyolefins, or combinations thereof. In one embodiment, a label of the present invention may be made from polyethylene terephtalate glycol-modified ("PET-G"). In still another embodiment, labels of the present invention may be prepared using paper or paper-like products.

Labels of the present invention may be configured in any manner suitable for a particular embodiment. By way of example, some labels of the present invention may have a thickness of about 10 to about 100 microns, including each intermittent value therein. In some embodiments, labels may have a thickness of about 20 to about 60 microns. Labels of the present invention may also have a single layer or multiple layers, and the labels may be prepared using clear films or colored films may be used.

Labels may be adhered to a material using a water-sensitive adhesive and/or a partially water-sensitive adhesive, such as a pressure-sensitive adhesive (PSA). In some embodiments, adhesives may be used that only have ample water sensitivity when the material upon which they are applied, such as a glass bottle, is broken, thereby exposing the adhesive to moisture. Such exposure to moisture initiates separation of the label from the bottle. However, in some embodiments, the water sensitivity of the adhesive should have only minor, if any, effects when the labels are being produced, converted for printing, or applied to the material, or when the material upon which the label is affixed is being transported, stored, sold in retail establishments, or used by a consumer. For example, some articles, such as beverage bottles, may retain the label in moist environments when the bottle is intact but the label may be readily removed as contemplated herein when the bottle is broken and the processes described herein are employed. In some embodiments of the present invention, adhesives may remain attached to the label as opposed to the material under the recycling processes disclosed herein.

In some embodiments, adhesives used in accordance with the present invention may include, without limitation, emulsions, solutions, hot melts, ultraviolet hot melts, and solvent-based adhesives. One of ordinary skill in the art will appreciate that, in some embodiments, adhesives of the present invention may be cross-linkable, such as by using, by way of example, metal complexes, aziridines, isocyanites, ultraviolet curing, or electron beam curing. In some embodiments, adhesives of the present invention may also include color dyes, fillers, and/or stabilizers, all of which are known in the art. Exemplary formulations that may be suitable for use in some embodiments of the present invention are set forth in U.S. Pat. No. 5,183,841, the contents of which is incorporated herein in its entirety.

Adhesives of the present invention may include, in some embodiments, components providing a hydrophilic nature to the adhesive. For instance, some adhesives may include hydrophilic comonomers such as vinyl pyridine, beta carboxy ethyl acrylate, acids with long side chain spacers, and macromonomers with hydrophilic blocks. Some embodiments of adhesives having the desired water sensitivity may include high molecular weight hydrophilic polymers. By way of example, such polymers may include, without limitation, polyethylene oxide, poly (meth)acrylic acids/salts, polyamides, and/or polyvinylpyrrolidone. Adhesive may also include monomers, such as dimethylaminoethyl methacrylate. Other such monomers and polymers will be readily apparent to one of ordinary skill in the art in light of the disclosure herein. Notwithstanding the foregoing, in some embodiments, it may be necessary to ensure that an adhesive is not overly water sensitive, which could result in undesirable results, such as decreased water whitening resistance, label edge dampening, and label release in humid or moist environments prior to recycling.

In some embodiments of the present invention, an acrylamide may be added to any monomers having a solubility parameters greater than about 10.5 in order to obtain the desired water sensitivity. In some applications, acrylamide ay be added in an amount that is greater than about 5% by weight. Any suitable acrylamide may used, such as N,N-dimethylacrylamide (NNDMA) adhesives with suitable water sensitivity may be prepared using monomers with solubility parameters greater than about 10.5

Adhesives used in conjunction with the present invention may include high molecular weight humectants, such as glycerol. In addition, surfactants, such as Pluronic® and Tetronic®, both available commercially from BASF, which have blocks of hydrophilic (PEO) and hydrophobic (PPO) moieties may be used. In some adhesives, such as hot melt adhesives which may be generally considered as hydrophoic, surfactants having blocks of hydrophilic and hydrophobic groups may provide improved results. For example, such surfactants may provide compatibility with acrylics and also create hydrophilic domains in the adhesive. In addition, thickeners/lattices, such as Acrysol ASE-60, available from Dow Chemical Company, and the like may be used in some adhesives used in the present invention. Furthermore, some adhesives contemplated herein may include tackifiers, such rosin acids/salts. In some embodiments, additives, such as poly(2-ethyl-2-oxazoline) (such as those available under the commercial brand Aquazol), poly(vinyl ethers) (such as those available under the commercial brand Lutenol), and/or polyvinyl alcohol may be added to the adhesive formulation. In some instances, polyvinyl alcohol may be added, additionally or alternatively, as a stabilizer. For hot melt adhesives, polymer additives such as acid functional aliphatic (such as Ricobond 5110 from Cray Valley) and aromatic (Ricobond 5120 from Cray Valley) may be used to increase the hydrophilic nature of an adhesive.

The foregoing examples are not limiting, and other components may be used to alter the water sensitivity of an adhesive. For instance, components such as styrene maleic anhydride copolymers may be added to styrene domains may render them water sensitive.

In one embodiment of the present invention, an acrylic emulsion pressure sensitive adhesive may contain a pressure sensitive adhesive copolymer of a plurality of copolymerizable monomers. The copolymerizable monomers include (a) one or more alkyl acrylates having from about 4 to about 12 carbon atoms in the alkyl group; (b) one or more acid monomers; (c) at least one hard monomer; and (d) optionally, at least one multifunctional crosslinking monomers.

In this exemplary embodiment, the acrylic emulsion pressure sensitive adhesive copolymer, in one embodiment, comprises a plurality of copolymerizable monomers, the major portion of which is one or more alkyl acrylates having about 4 to about 12 carbon atoms in the alkyl group. Non-limiting examples of alkyl acrylates having about 4 to about 12 carbon atoms in the alkyl group include butyl acrylate, hexyl acrylate, heptyl acrylate, n-octyl acrylate, iso-octyl acrylate, 2-ethylhexyl acrylate, isobutyl acrylate and nonyl acrylate. In one embodiment, the copolymer comprises about 75% to about 90% by weight of the alkyl acrylate having from about 4 to about 12 carbon atoms in the alkyl group. In another embodiment, the copolymer comprises about 77% to about 85% by weight of the alkyl acrylate. The copolymer comprises about 0.25% up to about 5% by weight, or from about 0.5% to about 3% by weight of at least one unsaturated carboxylic acid containing from 3 to about 8 carbon atoms. Non-limiting examples of ethylenically unsaturated carboxylic acids include acrylic acid, methacrylic acid, beta-carboxyethyl acrylate, itaconic acid and beta-carboxyethyl acrylate.

As used herein, the term "multifunctional crosslinking monomer" means a monomer means a monomer that is copolymerizable with acrylic monomers and that has at least one carbon-carbon double bond and at least one other functional group capable of entering into a polymerization or crosslinking reaction. In one embodiment, the copolymer comprises up to about 1% by weight of at least one multifunctional crosslinking monomer. In another embodiment, the copolymer comprises up to about 0.5%, or from about 0.01% to about 0.5% by weight of at least one multifunctional crosslinking monomer. Non-limiting examples of such monomers include multifunctional (meth)acrylates, e.g., diacrylates, triacrylates, dimethacrylates, and trimethylacrylates; multifunctional allylic compounds, e.g., diallyl maleate and allyl methacrylate; multifunctional crosslinking monomers having a vinyl group; and multifunctional crosslinking monomers having a reactive heteroatom-containing functional group such as the imidazolidone group. A non-limiting list includes the monomers shown in Table 1:

TABLE 1

| Multifunctional Monomer | Abbreviation |
| --- | --- |
| Allyl Methacrylate | AMA |
| Diallyl Maleate | DAM |
| Divinyl Benzene | DVB |
| Ethylene Glycol Dimethacrylate | EGDMA |
| N,N'-methylene-bis-acrylamide | NNMBA |
| Diallyl Phthalate | DAP |
| Butanediol Diacrylate | BDD |
| Hexanediol Diacrylate | HDDA |
| Tripropylene Glycol Diacrylate | TPGDA |
| Triallyl Cyanurate | TAC |
| Tetraethylene Glycol Diacrylate | TEGDA |
| Butanediol Dimethacrylate | BDDMA |
| Tetraethylene Glycol Dimethacrylate | TEDMA, TEGMA |
| Trimethylolpropane Triacrylate | TMPTA |
| Trimethylolpropane Trimethacrylate | TMPTMA, TRIM |
| Trimethylolpropane Diallyl Ether | TMPDAE |
| Imidazolidone Methacrylate | MEIO |

As used herein, the term "hard monomer" refers to a monomer the homopolymer of which is not inherently tacky at ambient temperatures and which has a Tg greater than about −25° C. Non-limiting examples include methyl and ethyl acrylate, methyl and ethyl methacrylate, vinyl acetate, styrene, and acrylonitrile. In one embodiment, the copolymer comprises about 10% to about 20% by weight of hard monomer, or about 15% to about 20% by weight of hard monomer.

The monomers in this embodiment may be polymerized in the presence of a surfactant or a mixture of surfactants. The total amount of surfactant used can be in the range of about 0 to about 7%, or about 1.3% to about 5% based on the weight of the polymer. Anionic surfactants, nonionic surfactants, and combinations thereof may be used. Suitable anionic surfactants include, for example, alkyl sulfates, alkyl phenol ethoxysulfates, alkyl sulfonates, alkaryl sulfonates and alkyl sulfosuccinates, such as for example, sodium lauryl sulfate, nonyl phenol ethoxy(4)sulfate, sodium dodecyl benzene sulfonate, disodium dioctyl sulfosuccinates, as well as mixtures thereof. Suitable nonionic surfactants include, for example, ethoxylated alkyl phenols, poly(ethylene oxide/propylene oxide) block copolymers, such as, for example, ethoxylated (10-60 moles ethylene oxide) nonyl phenol, as well as mixtures thereof.

In one embodiment, a combination of surfactants may be used in the course of polymerizing the monomers, with anionic surfactants being particularly useful. In particular, a mixture of two different surfactants may be used. In one embodiment, the first type of surfactant is a sulfate of an ethoxylated alcohol, e.g., a sodium lauryl ether sulfate. Non-limiting examples include Disponil FES 77 and Disponil FES 993 from Cognis Corp. and Polystep B-19 from Stepan Company. The second type of surfactant is, in one embodiment, a sulfosuccinate or derivative, e.g., a dioctyl ester of sodium sulfosuccinic acid. Non-limiting examples include Aerosol OT-75 from Cytec Industries, Inc. and Disponil SUS IC 875 from Cognis Corp. In another embodiment, the second type of surfactant is a modified fatty alcohol polyglycolether. Non-limiting examples include Disponil AFX 1080 and Disponil AFX 2075 from Cognis Corp.

In addition to the monomers and surfactants described above, additional ingredients, reagents, processing aids, and other components may be used in preparing embodiments of adhesives within the scope of the invention. A non-limiting list includes polymerization color dyes, fillers, stabilizers, catalysts (initiators), chain transfer agents, neutralizers, accelerators, tackifiers, defoaming agents, thickeners or rheology modifiers, buffers, antioxidants and biocides.

In some embodiments, suitable thermal polymerization initiators include, but are not limited to, sodium persulfate, potassium persulfate, ammonium persulfate, sodium perborated, and ammonium or alkali metal peroxy disulfate salts. The initiator may be used alone or in combination with a minor amount of one or more reducing components or activators, such as, for example sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids.

A chain transfer agent may be employed in the preparation of an adhesive contemplated herein. The weight average molecular weight (Mw) of the emulsion polymer may be adjusted through the addition of a chain transfer agent, such as n-dodecyl mercaptan, during emulsion polymerization to give a suitable balance of adhesive and cohesive strength. Suitable chain transfer agents include, but are not limited to, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate. According to one embodiment of the invention, chain transfer agent is not required but in some embodiments it is used in an amount of from 0.001 to 0.5, including from 0.0025 to 0.1, moles per kg dry polymer weight. Linear or branched $C_4$-$C_2$2 alkyl mercaptans such as n-dodecyl mercaptan and t-dodecyl mercaptan are particularly useful.

In the preparation of some acrylic emulsion polymers, a neutralizer may included. By "neutralizer", what is meant is a basic material that is capable of entering into an acid-base reaction with the acid monomer. Suitable neutralizers include poly-hydroxy functional amines, such as for example, triethanolamine, 2-[bis-(2-hydroxyethyl)-amino]-2-hydroxymethyl propane-1,3-diol (bis tris methane), 2-amino-2-(hydroxymethyl)-1,3-propanediol (trizma base), N-methyl-D-glucamine, N,N,N'N'-tetrakis-(2-hydroxyethyl)-ethylenediamine and N,N,N'N'-tetrakis-(2-hydroxypropyl)-ethylenediamine.

An organic salt, for example, sodium citrate, sodium gluconate or sodium acetate may be used in combination with the neutralizer to enhance the removability of the adhesive. An inorganic acid salt may also be used. Alternatively, an organic acid neutralized by a hydroxy amine can be used. Non-limiting examples of organic acids include acetic acid, p-toluene sulfonic acid, citric acid, gluconic acid, maleic acid and dodecylbenzene sulfonic acid. The organic acids can be either added to the water phase during the polymerization or added post polymerization.

Chemical crosslinkers may or may not be present in the composition. If present, the external crosslinkers are provided in an amount up to about 5 by weight, based on the weight of dry adhesive, to further increase the cohesive strength. Non-limiting examples of external crosslinkers include chromium acetate, zirconium ammonium carbonate, aluminum acetate, polyaziridines, carbodiimides and the like. For polyaziridines, the amount of crosslinker used is typically less than about 1% by weight, or about 0.6% or less by weight, based on the weight of dry adhesive.

In some embodiments, an adhesive composition of the present invention may contain an emulsifiable wax and a plasticizer. Non-limiting examples of emulsifiable waxes include emulsified petroleum resins, paraffin waxes, oxidized paraffin waxes, microcrystalline waxes, camauba waxes, montan waxes, polyethylene waxes, and the like. Non-limiting examples of plasticizers include phthalates, such as butyl benzyl phthalate, and dioctyl phthalate; adipates; benzoates; citrates, such as triethyl citrate and acyl tributyl citrate; maleates; oleates; phosphates; sebacates; stearates; epoxidized vegetable oils; rosin derivatives, and polymeric plasticizers, such as low molecular weight acrylic polymers that lower the Tg and storage modulus of the PSA.

The foregoing examples of adhesive formulations are strictly exemplary in nature. One of ordinary skill in the art will appreciate that any adhesives having sufficiently low water sensitivity to provide the desired adhesion during processing, application, and use of the label and also sufficiently high water sensitivity for removal after exposure of broken materials to outdoor conditions for ample time.

By way of further example, in some embodiments an adhesive having a relatively low peel adhesion may be employed, and such adhesive may or may not be water sensitive as described above. For example, adhesives providing a peel adhesion in the range of about 0.5 to about 6 N/in may be suitable for certain embodiments of the present invention. In other embodiments, the peel adhesion may be in a range of about 0.5 to about 2 N/in. Such removable adhesives may include, without limitation, acrylics, styrene-butadiene rubber (SBR) adhesives, ultraviolet hotmelt-based adhesives, and any other adhesives with suitable removability for a particular use.

In some embodiments, adhesive may be applied directly to a label or to a release liner, and such application may be accomplished by any conventional means. In addition, adhesive may be applied in any amount suitable for the desired releasability during the recycling process and non-releasability during ordinary conditions. By way of example, adhesive may be applied at about 2 to about 100 grams per square meter (g/m$^2$). In some embodiments, adhesive may be applied at less than about 15 g/m$^2$, less than about 12 g/m$^2$, or less than about 10 g/m$^2$.

The adhesion level of labels of the present invention may be varied as required by specific applications. In some embodiments, adhesives may be used such that labels are ultra-removable, removable, semi-removable, repositionable, or permanent. By way of example, the adhesion level may be in the range of greater than about 0 N/inch to greater than about 20 N/inch, including each intermittent value between greater than about 0 N/inch to greater than about 20.

As indicated above, water sensitive adhesives may be used in certain embodiments of the present invention. However, in some embodiments, it may be desirable that the adhesives are not overly water sensitive. For example, in some embodiments, labels may be formed in a wide roll and then slit into smaller rolls. In such embodiments, adhesive that is sensitive to air moisture could result in softened roll edges, which could pollute slitting equipment, and tacky roll edges, which could negatively impact printing of the labels. Similarly, water sensitivity may impact the printing process for labels, such as by polluting printing presses. In addition, over sensitivity may complicate the label application processes, such as by polluting the label applicator or obtaining poor label dispensability if tacky label edges result.

In addition, in some embodiments, adhesives for labels may chosen to avoid excessive water whitening on the label from moist environments, such as when a label is on a product stored refrigerator or ice chest or used in a high humidity location, such as in tropical regions. In addition, adhesives of labels of the present invention may avoid tacky label edges from moisture, which may not be desirable to consumers. Furthermore, many labels are applied to materials, such as beer bottles, using high speed processes. In some embodiments, labels of the present invention may have a water sensitivity that does not impact such high speed processes. In addition, adhesives and label materials may be used that result in relatively quick adhesion to materials after application. Such quick adhesion avoids complication during the label application process, particularly since containers may be filled before or after label application.

Other desired characteristics may also be considered in selecting an adhesive for removable labels for recycling. For example, an adhesive may be selected such that, during consumer use, the adhesion is high enough to avoid movement of the label over the material surface. In addition, in some embodiments, an adhesive may be selected to ensure adequate anchorage to a material. In some embodiments, an adhesive may be selected that does not dissolve during the applicable recycling process in order to avoid polluting the recycling site. Finally, as a final example, the adhesive should not bloom (i.e., sweat out) from the affixed label. The foregoing parameters are illustrative of criteria that may be used in selecting adhesives for use in some embodiments of the present invention.

In some embodiments of the present invention, labels may be utilized that do not exhibit a curling effect upon exposure to increased temperatures. In addition, in some embodiments of the present invention as noted above, the labels may be configured and applied to an article such that the label may be removed upon exposure to moisture and/or outdoor conditions, both as described herein, without heating above ambient temperature. In some embodiments, the required amount of liquid for removal of the label from broken glass material is minimal, as discussed above, such as less than 5%, 4%, 3%, 2%, or 1%, including all intermittent values therein, by weight of the weight of the glass material.

The following examples provide for the preparation of certain adhesives that may be used in some embodiments of the present invention:

The following examples illustrate several non-limiting embodiments of the invention, its preparation, and performance:

EXAMPLES

Examples A-D

Preparation of Base Polymers

Base polymers are prepared by free-radical emulsion polymerization according to the following procedure, using the components identified in the table below:

TABLE 2

| Component | Polymer A | Polymer B | Polymer C | Polymer D | Stage |
|---|---|---|---|---|---|
| | mass (g) | | | | |
| de-ionized water | 417.10 | 376.40 | 373.92 | 384.12 | inital |
| potassium persulfate | 4.76 | 4.55 | 4.74 | 0 | reactor |
| ammonium persulfate | 0 | 0 | 0 | 4.69 | loading |
| de-ionized water | 198.56 | 220.28 | 223.85 | 226.61 | pre- |
| Disponil FES 77 | 69.78 | 70.73 | 69.42 | 68.75 | emulsion |
| Disponil SUS IC 875 | 13.08 | 13.14 | 12.96 | 12.84 | |
| citric acid monohydrate | 0 | 0 | 30.16 | 31.47 | |
| 2-ethylhexyl acrylate | 1312.35 | 1323.70 | 1306.23 | 1293.52 | |
| methyl methacrylate | 194.43 | 295.56 | 193.94 | 192.05 | |
| methyl acrylate | 97.10 | 0 | 96.97 | 96.03 | |
| acrylic acid | 16.30 | 16.42 | 16.20 | 16.05 | |
| EGDMA | 0.57 | 0 | 0 | 0 | |
| DAM | 0 | 6.57 | 2.42 | 2.39 | |
| n-dodecyl mercaptan | 0.28 | 0 | 0 | 0 | |
| de-ionized water | 116.96 | 118.85 | 116.41 | 119.23 | initiator |
| potassium persulfate | 4.76 | 4.55 | 4.74 | 0 | solution |
| ammonium persulfate | 0 | 0 | 0 | 4.69 | |
| Acticide LA | 1.17 | 2.52 | 2.42 | 2.39 | biocide |
| de-ionized water | 52.80 | 46.74 | 45.62 | 45.17 | rinsing |
| TOTAL | 2500.00 | 2500.00 | 2500.00 | 2500.00 | |

A reactor equipped with a stirrer, heat source and nitrogen inlet is purged with nitrogen and charged with water, then heated to 78° C. Potassium persulfate or ammonium persulfate is added to the reactor, and the reactor contents are mixed for five minutes. Thereafter, the pre-emulsion mixture is fed into the reactor over a 230 minute period. The temperature of the reactor batch is allowed to rise to 79-81° C. and then maintained at that temperature throughout the polymerization reaction. An initiator solution feed is commenced after the pre-emulsion feed begins. Twenty-five minutes after the pre-emulsion feed is complete, the initiator feed is complete and the reactor contents are held at 79-81° C. for 60 minutes. The reactor contents are then allowed to cool, and when the temperature reaches 38° C., a biocide is added. The rinse water is used throughout the process to wash out the various feed vessels and lines, and to rinse the reactor at the end of the polymerization. Base Polymer A has a solids content of about 66% and a pH of 1.8.

Examples 1-8

Preparation of Pressure Sensitive Adhesive

Using the Base Polymers described above, a series of pressure sensitive adhesive compositions are prepared by compounding the base polymer and neutralizing it with a hydroxy functional amine or blend thereof. In several examples, a salt from an organic acid is used.

Table 3 identifies the neutralizing agent, and the salt, if any, used to produce the adhesive compositions of Examples 1-8 and Comparative Example A. Examples 1-7 are prepared using Base Polymer A. Example 8 is prepared using Base Polymer B. Comparative Example A is Base Polymer A neutralized with ammonia and is referenced for comparison in Example 16 below. The amount of neutralizing agent and salt listed is in parts by weight per 100 parts dry polymer.

The abbreviations used below are as follows:
Bis Tris Methane 2-[bis-(2-hydroxyethyl)-amino]-2-hydroxymethylpropane-1,3-diol
TEA triethanolamine
Trizma 2-amino-2-(hydroxymethyl)-1,3-propanediol
NMDG N-methyl-D-glucamine
HEEDA N,N,N',N'-tetrakis-(2-hydroxyethyl)-ethylenediamine
HPEDA N,N,N',N'-tetrakis-(2-hydroxypropyl)-ethylenediamine
Na-Cit sodium citrate dihydrate
Na-Glu sodium gluconate
ammonia 12% ammonia

TABLE 3

| Example | Neutralizing Agent(s) |  | Salt |  |
|---|---|---|---|---|
| 1 | Bis Tris Methane | 3.24 | Na-Cit | 2.98 |
| 2 | Bis Tris Methane | 1.52 | Na-Cit | 2.98 |
|   | TEA | 3.30 |   |   |
| 3 | Trizma | 1.52 | — | — |
| 4 | Trizma | 2.28 | — | — |
| 5 | Trizma | 1.52 | Na-Cit | 2.98 |
| 6 | NMDG | 2.02 | — | — |
| 7 | NMDG | 2.53 | Na-Glu | 1.49 |
| 8 | NMDG | 1.59 | — | — |
| Comp. A | Ammonia | 0.70 | — | — |

Examples 9-12

Preparation of Pressure Sensitive Adhesive

Using Base Polymer A, pressure sensitive adhesive compositions are prepared substantially in accordance with the procedure of Example 1 with the exception that varying amounts of a carbodiimide crosslinker (Carbodilite E-02 from Nisshinbo Industries) is used.

Examples 13-15

Preparation of Pressure Sensitive Adhesives

Example 13 is prepared substantially in accordance with the procedure of Example 1, with the exception that Base Polymer C is used. Examples 14, 15, and 16 are prepared substantially in accordance with the procedure of Example 1, with the exception that Base Polymer D is used. Base Polymers C and D both include an organic acid in the polymerization pre-emulsion. Neutralizing agents were added as set forth in Table 4 as parts per 100 parts of dry polymer.

TABLE 4

| Example | Neutralizing Agent(s) |  |
|---|---|---|
| 13 | Bis Tris Methane | 2.94 |
|    | TEA | 3.30 |
| 14 | Bis Tris Methane | 2.94 |
|    | TEA | 3.30 |
| 15 | HEEDA | 3.20 |
|    | TEA | 2.89 |
| 16 | HPEDA | 9.20 |

The following example illustrates one embodiment of the present invention:

Example 16

Testing was conducted on twenty glass bottles with 50 micron biaxially-oriented polypropylene film labels. The labels were affixed using the acrylic adhesive of Example 16 listed above. The adhesive was applied to the labels at 18 g/m². The bottles were broken by dropping them from a height of 2 meters. The broken glass was collected and stored outside for 3 days. During the outside storage period, the conditions included a temperature in the range of 2-7° C. and occasional rain. After three days of outside storage, the broken glass was put into a cement mixer, which was operated for 5 minutes at 23 rpm. As a reference, dry broken glass bottles with the same labels were also separately tested in a cement mixer. After the cement mixer treatment was complete, the glass was separated into two fractions: 1) glass having label fragments, and 2) glass without label fragments. The fractions were weighed and the % of glass with and without labels calculated. As shown below, by using outdoor storage, a recycling process of the present invention advantageously produced improved separation of glass from the label material.

| Results wt % of glass having label material adhered to glass ||
|---|---|
| Outdoor wet glass | Indoor dry glass |
| 4.5% | 23.7% |

By comparison, the same testing was conducting using the Comparative Example A formulation referenced above as the adhesive. Upon testing, the following results were obtained:

| Results wt % of glass having label material adhered to glass ||
|---|---|
| Outdoor wet glass | Indoor dry glass |
| 23.5% | 27.5% |

As indicated by the testing results above, the water sensitive adhesive resulted in a label that was more readily removed during the recycling process.

In some embodiments, the present invention also includes processes for the removal of labels without adding any water or liquid from an artificial source, such as a sprinkler or water jet, and/or from a natural source, such as rain water or dew. For example, bottles and food containers may often have residual water or liquid in the bottle or container. In some embodiments, such water or liquid may provide suitable moisture for removal of a label using the processes described above without the addition of water or liquid prior to any cleansing process for the bottle or container. In some embodiments, water or liquid may not be added for the label removal except for any natural exposure, such as, from example, from rain, dew, or humidity.

Example 17

Testing was conducted on twenty glass bottles with 50 micron biaxially-oriented polypropylene film labels. The labels were affixed using the acrylic adhesive of Example 16 listed above. The adhesive was applied to the labels at 18 g/m². The bottles were broken by dropping them from a height of 2 meters. Each broken bottle was then provided with the water content specified in the chart below. The water percentage shown in the chart indicates the percentage of water by weight of the broken dry glass weight. The broken glass was then rotated one revolution in the cement mixer to distribute any added water, and then a "soak time" indicated in the chart was permitted before any further action. After the designated soak time, the broken glass was rotated in a cement mixer, which was operated for the mixing time designated in the chart minutes at 23 rpm. After the cement mixer treatment was complete, the glass was separated into two fractions: 1) glass having label fragments, and 2) glass without label fragments. The fractions were weighed and the percentage of glass with and without labels calculated, and the percentage of glass having label material adhered to the glass is reported as the waste percentage below. Comparative testing was also performed using the Comparative Example A formulation, and the results are also provided in the chart.

| | | | Waste (%) | |
|---|---|---|---|---|
| Mixing Time (min) | Water (%) | Soak Time (min) | Adhesive Example 16 (HPEDA) | Comparative Example A |
| 1 | 0 | not applicable | 23.5 | 27.5 |
| 1 | 0.5 | 1 | 12.1 | — |
| 1 | 0.5 | 30 | 9.9 | — |
| 1 | 1 | 0 | 5.7 | — |
| 1 | 1 | 1 | 4.1 | — |
| 1 | 1 | 30 | 5.3 | — |
| 1 | 1 | 12 hour | 0 | 25.1 |
| 5 | 1 | 1 | 0 | — |

As shown by the results above, it was observed that substantial label removal was obtained with minimal moisture exposure and minimal soaking times and, in some instances, complete label removal was obtained. In some embodiments of the present invention, a soak time of less than five minutes, including less than four, three, two, or one minute(s) may be used.

As noted above, in some embodiments, labels applied with a removable adhesive, whether a water-sensitive adhesive or not, may be used in some embodiments of the present invention. Example 18 provides testing data for various labels in connection with their corresponding peel adhesion.

Example 18

Glass bottles with labels applied using the adhesives identified in the chart below were broken and processed as described above in Example 17. The material was then tested for waste percentage, wherein the waste percentage reported in the chart is the percentage of glass having label material adhered to it after mixing in the cement mixer. The 90° peel adhesion, reported in N/inch, was measured after twelve-hour exposure to 2.5% added water using a peel speed of 300 mm/min. A bond time of twenty-four hours was used before running the test. Generally, as shown by the results below, lower peel adhesions resulted in more desirable separation of the labels from the glass bottles. In other embodiments, a removable solvent acrylic, such as Samples 2 and 3 discussed above, may be used.

| Adhesive | Type of Adhesive | % Waste | Peel Adhesion under Wet Conditions |
|---|---|---|---|
| Comparative Example A | permanent emulsion acrylic | 26.1 | 10 |
| 4 | removable emulsion acrylic | 10.4 | 2 |
| 5 | removable UV acrylic hotmelt | 11.6 | 4 |
| adhesive example 16 (HPEDA) | permanent acrylic emulsion water sensitive | 0.0 | 0 |

As indicated above, the recycling processes, labels, and adhesives described herein may be used in any suitable application. In some instances, the present invention may be used to recycle glass bottles and to provide affixed labels to the bottles to aid in the recycling process. In other embodiments, other containers or materials may be recycled using the processes and materials contemplated and disclosed herein.

These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A method for recycling a recyclable material having an affixed label, the method comprising:
   breaking the material having a label into pieces,
   exposing the pieces to outdoor conditions until at least a partial separation of some portion of label separates from the material,
   spinning the pieces, and
   separating the material from the label;
   wherein the spinning is performed in a cement mixer.

2. The method of claim 1 wherein the material forms a container.

3. The method of claim 1 wherein the material is at least one of glass, polymer, and metal.

4. The method of claim 1 wherein the material is a bottle.

5. The material of claim 1 wherein the material is a glass bottle.

6. The method of any one of claims 1 wherein the label is a film.

7. The method of any one of claims 1 wherein the label is adhered to the material by an adhesive.

8. The method of claim 7 wherein the adhesive has a water sensitivity.

9. The method of claim 8 wherein the adhesive has a water sensitivity that prohibits separation of the label from the material during processing and use of the label and that initiates separation of the label from the material when the material is broken and exposed to outdoor conditions.

10. The method of claim 9 wherein the water sensitivity does not result in the label edges becoming tacky during a label manufacturing process.

11. The method of claim 1 wherein the label when applied to unbroken material does not have excessive water whitening when exposed to moist environments.

12. The method of claim 7 wherein the adhesive provides adhesion sufficient to avoid movement of the label when applied to the material.

13. The method of claim 7 wherein the adhesive remains attached to the label upon separation from the material.

14. The method of claim 7, wherein the adhesive is a water sensitive adhesive.

15. The method of claim 7, wherein the adhesive is a pressure sensitive adhesive.

16. The method of claim 7, wherein the adhesive comprises an acrylamide.

17. The method of claim 16, wherein the acrylamide is included in an amount of greater than about 5 wt % of the adhesive.

18. The method of claim 16, wherein the acrylamide is N,N-dimethylacrylamide.

19. The method of claim 7, wherein the adhesive comprises a hydrophilic comonomer.

20. The method of claim 7, wherein the adhesive comprises vinyl pyridine.

21. The method of claim 7, wherein the adhesive comprises beta carboxyl ethyl acrylate.

22. The method of claim 7, wherein the adhesive comprises an acid with long side chain spacers.

23. The method of claim 7, wherein the adhesive comprises a macronomer with hydrophilic blocks.

24. The method of claim 1 wherein the method further comprises adding water to the pieces during exposure to outdoor conditions.

25. The method of claim 1 wherein the outdoor conditions comprise temperatures above the freezing point for water.

26. The method of claim 1 wherein the outdoor conditions comprise temperatures in the range of about −20° C. to about 40° C.

27. The method of claim 1 wherein the outdoor conditions comprise moisture.

28. The method of claim 1 wherein the pieces have a moisture content of at least about 2% by weight.

29. The method of claim 28 wherein the pieces have a moisture content of at least about 0.5% by weight.

30. The method of claim 1 wherein the label remains intact when the material is broken into pieces.

31. The method of claim 1 wherein the label is partially broken into pieces when the material is broken into pieces.

32. The method of claim 1 wherein the outdoor conditions are based upon actual outdoor exposure.

33. The method of claim 1 wherein the outdoor conditions are simulated outdoor conditions.

34. The method of claim 1, wherein no liquid from an artificial source is added to the pieces prior to or during the separating.

* * * * *